(12) United States Patent
Sowig

(10) Patent No.: US 6,288,503 B1
(45) Date of Patent: Sep. 11, 2001

(54) COMPENSATION OF PICTURE TUBE AGEING EFFECTS

(75) Inventor: Helmut Sowig, Villingen-Schwenningen (DE)

(73) Assignee: Deutsche Thomas-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/340,816

(22) Filed: Jun. 28, 1999

(30) Foreign Application Priority Data

Jun. 30, 1998 (DE) .............................................. 198 29 031

(51) Int. Cl.⁷ ....................................................... G09G 1/04
(52) U.S. Cl. .......................... 315/381; 315/408; 315/291; 348/379
(58) Field of Search ................................ 315/381, 382.1, 315/403, 404, 291, 408; 348/284, 300, 379, 377, 380

(56) References Cited

U.S. PATENT DOCUMENTS

| | | | |
|---|---|---|---|
| 3,555,348 | * 1/1971 | Van Clifton Martin | 315/20 |
| 4,160,995 | 7/1979 | Jensen | 358/29 |
| 4,438,366 | * 3/1984 | Kamata | 315/1 |
| 5,130,615 | * 7/1992 | George | 315/381 |
| 5,894,327 | * 4/1999 | Griepentrog | 348/379 |

FOREIGN PATENT DOCUMENTS

| | | | |
|---|---|---|---|
| 2702817A1 | 9/1977 | (DE) | H04N/9/535 |
| 1575604 | 9/1980 | (GB) | H04N/5/18 |

OTHER PUBLICATIONS

Patent Abstracts of Japan, Pub. No. 01–103091 [JP1103091], pub. Apr. 20, 1989.
Patent Abstracts of Japan, Pub. No. 56–112184 [JP 56112184 A], pub. Sep. 4, 1981.
Patent Abstracts of Japan, Pub. No. 06–292223 [JP 6292223 A], pub. Oct. 18, 1994.
Hartmut Harlos, "Integrated TV circuits including cut–off point control", Funk–Technik 38, 1983, Issue.1, pp. 25–29. (translation included).
*corresponds to DE2702827A1, cited under reference AM.

* cited by examiner

*Primary Examiner*—Don Wong
*Assistant Examiner*—Trinh Do Dinh
(74) *Attorney, Agent, or Firm*—Joseph S. Tripoli; Paul P. Kiel

(57) ABSTRACT

At the onset of ageing or in the further course of their service life, color picture tubes relatively frequently exhibit a rise in the field strength between the cathode (K) and the Wehnelt electrode ($G_1$) of the respective beam system on account of a blooming effect of the cathodes (K) which is known per se and reduces the spacing between cathode (K) and Wehnelt electrode ($G_1$). The cut-off regulation reacts to an effect of this type in a manner such that the reverse voltage acting between cathode (K) and Wehnelt electrode ($G_1$) is correspondingly reduced in order to be able to drive the same reference cathode current. However, the reaction of the cut-off regulation must be taken into account for the circuit design since this would otherwise result in an unacceptable reduction in the modulation range, which would, in turn, have an adverse effect on the maximum contrast setting.

The invention provides a regulating device (10) which makes it possible to automatically compensate for an ageing-related change in the field strength between the cathode (K) and the Wehnelt electrode ($G_1$) of the respective tube system of a color picture tube (1), the cut-off regulating voltage produced in the respective RGB color channel on account of the cut-off regulation being used as the controlled variable for the regulating device (10).

6 Claims, 1 Drawing Sheet

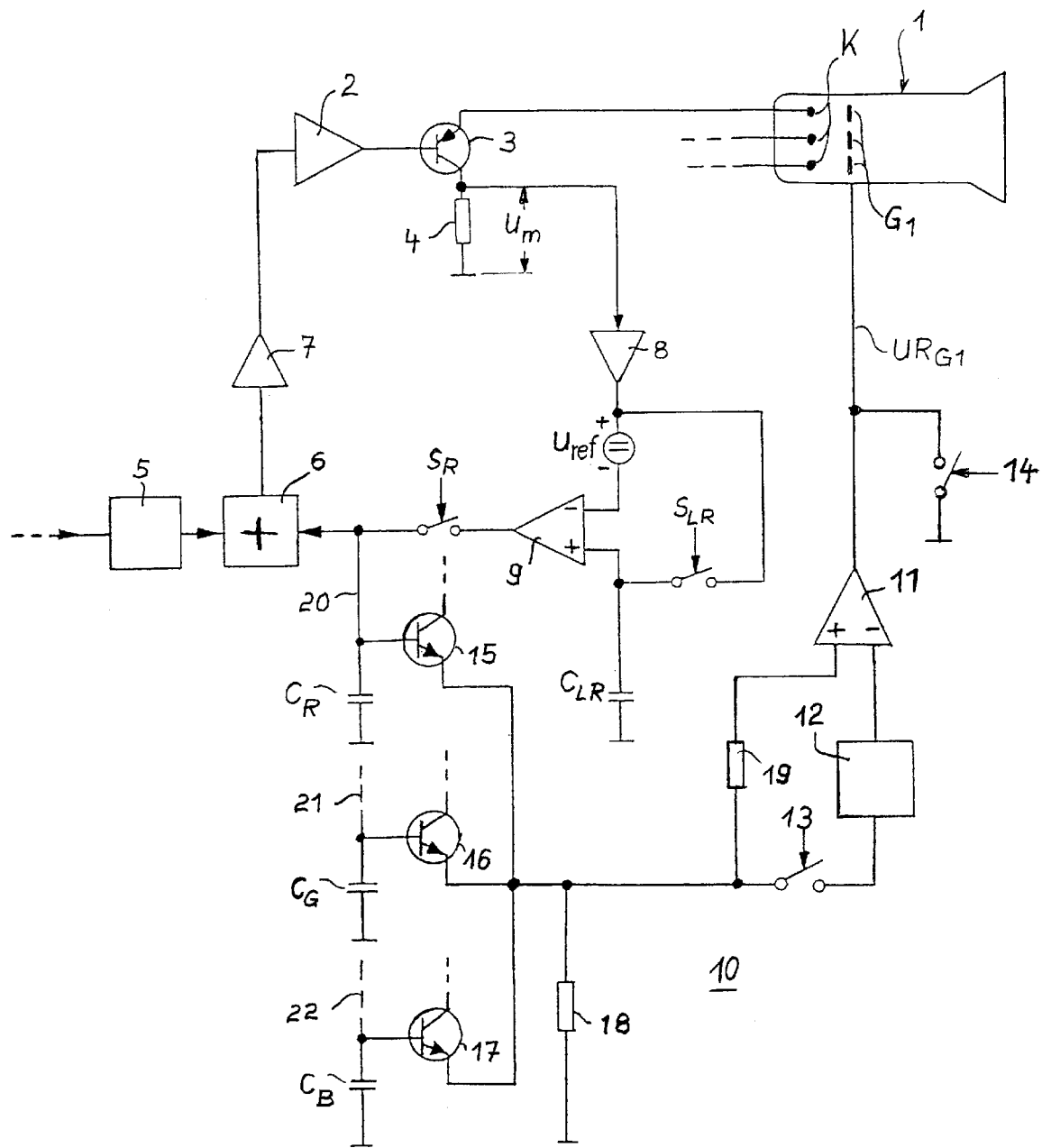

COMPENSATION OF PICTURE TUBE AGEING EFFECTS

BACKGROUND OF THE INVENTION

The invention relates to the driving of picture tubes, in particular of colour picture tubes used in television receivers or monitors.

The colour picture tubes used in contemporary colour television sets are predominantly controlled via the cathode of the respective beam current system, the maximum possible luminous efficiency being determined by the respectively available modulation range. The control electrodes designed as a Wehnelt electrode are usually connected to reference-earth potential (earth). In order to obtain a high luminous efficiency, variables which limit the modulation range, such as e.g. maximum supply voltage of the RGB output stages, saturation of the RGB output stages, cut-off regulating range, must be carefully taken into account during the circuit design.

For the colourless reproduction of black and white pictures, it is customary in contemporary colour television sets to provide a cut-off regulation for each colour channel. In this case, a so-called cut-off measurement line is respectively keyed in during a vertical blanking interval, to which line a reference cathode current $I_{k1}$ of e.g. 10 $\mu$A corresponds. Cut-off regulation of this type is known e.g. from the video processor circuit TDA4580 from Valvo.

Tubes go through various phases during their ageing process. At the beginning, roughening and, as it were, blooming of the cathode surfaces frequently occur.

These reduce the effective spacing between cathode and Wehnelt electrode. If the operating voltages are kept constant, the field strength between the electrodes therefore increases and, consequenty, the cathode current decreases. With increasing age, more and more cathode material is eroded, with the result that the effect is reversed. The cut-off regulation reacts to the rise in the field strength described first in a manner such that the reverse voltage acting between cathode and Wehnelt electrode is correspondingly reduced in order to be able to drive the same reference cathode current $I_{k1}$. However, the reaction of the cut-off regulation must be taken into account for the circuit design since this results in a reduction in the modulation range, which, in turn, has an adverse effect on the maximum luminous efficiency that can be achieved.

SUMMARY OF THE INVENTION

The object of the invention, therefore, is to eliminate in particular such ageing-related impairments of a picture tube and also other changes which might reduce the modulation range by way of the cut-off regulation.

This object is achieved by means of the invention specified in claim 1.

The invention is based on the idea of modifying the cut-off regulation in such a way that an ageing-related change in the field strength between the cathode and the Wehnelt electrode of the respective beam system of a colour picture tube is automatically compensated for. According to the invention, the decreasing of the cathodes below a defined potential is prevented by shifting the potential of the Wehnelt electrodes oppositely with regard to the cathodes by regulation by means of a DC voltage offset. Consequently, it is ensured that the quasi cut-off—that is the voltage potential of the measurement line at the "highest" cathode, which potential is calibrated with the aid of the screen grid voltage calibration to a voltage defined during the circuit design—which is usually calibrated in the apparatus manufacturing process is not undershot by any of the three beam systems present in a colour picture tube. It is essential that differences between the systems are still corrected by means of the cathodes.

The same principle according to the invention can be applied in order to prevent the cathodes from rising above a defined potential.

Since ageing-related tolerances are no longer corrected exclusively by means of the picture tube cathodes, which are driven by amplifier stages having a limited modulation range (between reference-earth potential and positive operating voltage $V_{cc}$), the invention has the advantage that the respective available modulation range for the useful signal becomes larger or is maintained and can thus be better utilized.

Furthermore, the invention has the advantage that, in the event of a repair which might influence the cut-off loop (e.g. picture tube, video processor, $\mu$p or memory), the apparatus can be calibrated in a conventional manner by the Wehnelt electrodes simply being earthed and, after correct calibration, the measurement loop can be reinitialized.

BRIEF DESCRIPTION OF THE DRAWING

The invention is explained in more detail using an exemplary embodiment.

In this embodiment, the single FIGURE uses a block diagram to show one of the similar colour channels of a circuit which processes RGB colour signals, having cut-off regulation of the respective tube system of a colour picture tube 1 and regulation according to the invention, which prevents the cathodes from decreasisng below a defined value—for the purpose of maintaining a larger modulation window.

DETAILED DESCRIPTION OF THE PREFERRED EMBODIMENT

A measurement transistor 3 for the dark current measurement is arranged in the respective colour channel between the cathode K of a tube system of the colour picture tube 1 and the output of a video output amplifier stage 2. For this purpose, the collector of the measurement transistor 3, which is designed as an npn transistor, is connected to reference-earth potential via a so-called measuring resistor 4. The emitter of the measurement transistor 3 is connected to a cathode K of the colour picture tube 1, while the base is connected to the output of the video output amplifier stage 2, with the result that the colour picture tube 1 is driven via the respective measurement transistor 3. For the measurement of the dark current, a cut-off measurement line is keyed into the respective colour channel during a vertical blanking interval by means of a blanking and measurement pulse generator circuit 5, which is arranged in the course of the RGB colour signal path upstream of an addition stage 6.

The addition stage 6 in the respective colour channel controls the video output amplifier stage 2 with a summation signal via an output stage 7. During the processing of the video signal, the summation signal is composed of the signal voltage of an RGB signal and a voltage which is updated e.g. in each case in a field-by-field manner and is stored in a storage capacitor $C_R$ (and, respectively, $C_G$ and $C_B$ for the colour channels "green" and "blue") as regulating voltage for the cut-off regulation of the RGB signal. On the other hand, during the determination of the regulating voltage— called cut-off regulating voltage below—the summation signal is formed by the pulse voltage of the keyed-in cut-off measurement line and the cut-off regulating voltage, which is in this case produced on the basis of the comparison of the voltage $U_m$ measured across the measuring resistor 4 with a reference voltage $U_{ref}$.

During the determination of the cut-off regulating voltage, the voltage $U_m$ measured across the measuring resistor 4 is fed to the inverting input of an operational amplifier 9, designed as a comparator, via a series circuit formed by a buffer stage 8 and the voltage source for generating a reference voltage $U_{ref}$, the non-inverting input of which operational amplifier is connected to reference-earth potential via a storage capacitor $C_{LR}$ which is provided for storing a voltage proportional to the leakage current. A sampling switch $S_{LR}$ is provided for the e.g. field-by-field updating of this voltage which compensates for the influence of the leakage current. By means of the sampling switch $S_{LR}$, which, like the storage capacitor $C_{LR}$ illustrated, is intended to be assigned to the colour channel "red", the reference voltage source $U_{ref}$ can be connected to the non-inverting input of the operational amplifier 9 in such a way that it is bridged together with the two inputs of the operational amplifier 9 during the measurement and storage of the voltage proportional to the leakage current. The switch position illustrated is assumed during the determination of the cut-off regulating voltage.

The cut-off regulating voltage, which is generated by the operational amplifier 9 designed as a comparator and is updated in accordance with the respective measurement cycle, is in this case stored for the cut-off regulation via a sampling switch $S_R$ in the storage capacitor $C_R$ (and, respectively, $C_G$ and $C_B$ for the colour channels green and blue). The switch position corresponds to the RGB signal processing.

The circuit section described thus far, which is known per se, has added to it, according to the invention, a regulating device 10, which automatically compensates for, inter alia, ageing-related changes in the field strength between cathode and Wehnelt electrode $G_1$ of the respective tube system of a colour picture tube 1 which would lead to a reduction in the available modulation window. The regulating device 10, which in this case advantageously utilizes the respective cut-off regulating voltage as the controlled variable, essentially comprises an operational amplifier 11 designed as a regulator, a non-volatile read/write memory 12 for storing a reference value used as the reference variable, a first controllable switch 13, a second controllable switch 14 and a measurement circuit which can he used to determine the abovementioned ageing-related changes in field strength.

The measurement circuit is preferably formed with three measurement transistors 15, 16, 17 respectively assigned to an RGB colour channel, which transistors are connected as emitter followers and have a common emitter resistor 18 and, consequently, form an OR circuit. The measurement transistors 15, 16, 17 are e.g. npn transistors to whose base there is fed, via a connecting line 20, 21 and 23, respectively, the cut-off regulating voltage stored in the storage capacitor $C_R$, $C_G$ and $C_B$, respectively. The collector of the measurement transistors 15, 16, 17 is connected to a positive potential of an operating voltage source (not illustrated). The circuit configuration of the three measurement transistors 15, 16 and 17 as emitter followers ensures that the respective time constant produced with the input resistance of a measurement transistor 15, 16 and 17, respectively, and a storage capacitor $C_R$, $C_G$ and $C_B$, respectively, has practically no influence on the storage behaviour for the cut-off regulating voltage and thus on the actual cut-off regulation.

The common emitter resistor 18 of the three measurement transistors 15, 16, 17 serves as a measuring resistor. According to the invention, the largest cut-off regulating voltage that occurs in each case can be measured across this resistor 18. After manufacturing calibration of the screen grid, this voltage is read into the memory 12 via the switch 13 and then serves as a reference value.

The cut-off regulating voltage picked off at the emitter resistor 18 is fed as the controlled variable via a resistor 19 into the non-inverting input of the operational amplifier 11, where it is compared with the reference value of the read/write memory 12 fed into the inverting input, in order to obtain a regulating voltage $UR_{G1}$ which is fed from the signal output of the operational amplifier 11 to the common connection of the Wehnelt electrodes $G_1$, in order to compensate for decreasing of the cathode potentials below a defined level as a reaction of the cut-off regulation to ageing-related effects, which would otherwise have to be taken into account during conception of the circuit design of the respective RGB colour channel. For example, the ageing-related increase in the field strength can be compensated for, according to the invention, with a regulating voltage $UR_{G1}$ at the Wehnelt electrodes $G_1$ which is positively directed relative to reference-earth potential (earth). As a result, the signal output of the operational amplifier 11 can advantageously be realized with an emitter follower, because the signal output can thus be made to have such a low impedance that it is possible to dispense with an earthing capacitor at the Wehnelt electrodes $G_1$.

For obtaining the reference value and storing it in the read/write memory 12, an initialization mode of the apparatus is preferably provided and can be started e.g. at the factory (or in the event of a repair) by means of an apparatus remote control (not illustrated).

For this purpose, the apparatus calibration with regard to the screen grid and cut-off is performed with the switch 14 closed.

With the ending of the initialization mode, the two switches 13, 14 are controlled such that they assume the position illustrated (i.e. the open position). This position corresponds to normal operation of the apparatus.

Although the invention has been described using conventional components, these can nonetheless be integrated in a video processor designed as an integrated circuit. The principle can likewise be applied to designs in which the regulating voltages across Cr, Cg and Cb are present in digitized form in a semiconductor memory.

What is claimed is:

1. Circuit arrangement which processes video signals for a colour picture tube or a projection tube mode of an apparatus having a device for cut-off regulation of a respective tube system of the colour picture tube by means of a reference cathode current, to which an artificial black value corresponds and which is caused by a measurement pulse inserted into drive signals of the colour picture tube or of the projection tubes in each RGB colour channel, in each case during a vertical blanking interval, by a video signal processor, the cut-off point of the respective measurement pulse being regulated, with a regulating voltage produced on account of the cut-off regulation, by means of a DC voltage offset in such a way that the reference cathode current is produced in each case, and a regulating device for preventing a minimum quasi cut-off set at the cathodes from being undershot by comparing cut-off regulating voltage produced in the respective RGB colour channel on account of the cut-off regulation with a reference value to obtain a regulating voltage which is fed to the Wehnelt electrodes of the colour picture tube, wherein the cut-off regulating voltage which is produced during an initialization mode of the apparatus is used as the reference value;

said regulating device comprising:

a measurement circuit preferably formed with three measurement transistors respectively assigned to an RGB colour channel, which transistors are connected as emitter followers and have a common emitter resistor at which the cut-off regulating voltage is picked off, and a non-volatile read/write memory for storing the cut-off regulating voltage, which is produced during the initialization mode of the apparatus, as the reference value of the regulating device.

2. The circuit arrangement according to claim 1, wherein controllable switches are provided for the initialization mode of the apparatus, which initialization mode can be started at the factory or in the event of a repair and by means of which initialization mode the cut-off regulating voltage picked off at the common emitter resistor in this mode can be fed to a write input of the non-volatile read/write memory,and can be stored as the reference value or reference variable for the regulating device.

3. The circuit arrangement according to claim 1, wherein the measurement circuit is realized partly or completely in digital form in a processor.

4. Circuit arrangement which processes video signals for a colour picture tube or a projection tube having a device for cut-off regulation of a respective tube system of the colour picture tube by means of a reference cathode current, to which an artificial black value corresponds and which is caused by a measurement pulse inserted into drive signals of the colour picture tube or of the projection tubes in each RGB colour channel, in each case during a vertical blanking interval, by a video signal processor, the cut-off point of the respective measurement pulse being regulated, with a regulating voltage produced on account of the cut-off regulation, by means of a DC voltage offset in such a way that the reference cathode current is produced in each case, and a regulating device for preventing a minimum quasi cut-off set at the cathodes from being exceeded by comparing cut-off regulating voltage produced in the respective RGB colour channel on account of the cut-off regulation with a reference value to obtain a regulating voltage which is fed to the Wehnelt electrodes of the colour picture tube, wherein the cut-off regulating voltage which is produced during an initialization mode of the apparatus is used as the reference value;

said regulating device comprising:

a measurement circuit preferably formed with three measurement transistors respectively assigned to an RGB colour channel, which transistors are connected as emitter followers and have a common emitter resistor at which the cut-off regulating voltage is picked off, and a non-volatile read/write memory for storing the cut-off regulating voltage, which is produced during the initialization mode of the apparatus, as the reference value of the regulating device.

5. The circuit arrangement according to claim 4, wherein controllable switches are provided for the initialization mode of the apparatus, which initialization mode can be started at the factory or in the event of a repair and by means of which initialization mode the cut-off regulating voltage picked off at the common emitter resistor in this mode can be fed to a write input of the non-volatile read/write memory and can be stored as the reference value or reference variable for the regulating device.

6. The circuit arrangement according to claim 4, wherein the measurement circuit is realized partly or completely in digital form in a processor.

* * * * *

UNITED STATES PATENT AND TRADEMARK OFFICE
CERTIFICATE OF CORRECTION

PATENT NO. : 6,288,503 B1  
DATED : September 11, 2001  
INVENTOR(S) : Helmut Sowig Page 1 of 1

It is certified that error appears in the above-identified patent and that said Letters Patent is hereby corrected as shown below:

<u>Title page,</u>  
Item [73], the name of the Assignee should read -- Deutsche Thomson-Brandt GmbH --.

Signed and Sealed this

Twenty-third Day of April, 2002

Attest:

JAMES E. ROGAN  
*Attesting Officer*  *Director of the United States Patent and Trademark Office*